(12) United States Patent
Hall

(10) Patent No.: US 6,565,283 B1
(45) Date of Patent: May 20, 2003

(54) ARTIFICIAL REEF UNIT AND METHOD OF FORMING THE SAME

(76) Inventor: Alethea Rosalind Melanie Hall, Plot 40, Dawn Farm, Driefontein, Muldersdrift, 1747 (ZA)

( * ) Notice: Subject to any disclaimer, the term of this patent is extended or adjusted under 35 U.S.C. 154(b) by 0 days.

(21) Appl. No.: 09/762,454
(22) PCT Filed: Aug. 6, 1999
(86) PCT No.: PCT/IB99/01397
§ 371 (c)(1),
(2), (4) Date: Mar. 19, 2001
(87) PCT Pub. No.: WO00/08260
PCT Pub. Date: Feb. 17, 2000

(30) Foreign Application Priority Data

Aug. 7, 1998 (ZA) ................................ 98/7132

(51) Int. Cl.⁷ .............................. E02B 3/04; E02B 3/06
(52) U.S. Cl. ........................... 405/21; 405/15; 405/25; 405/35; 405/115; 119/221
(58) Field of Search ............................ 405/15–19, 21, 405/31, 32, 34, 35, 25, 91, 107, 110–115, 23; 119/207, 208, 209, 221

(56) References Cited

U.S. PATENT DOCUMENTS

| | | | | |
|---|---|---|---|---|
| 3,191,386 A | * | 6/1965 | Weigel et al. ............... | 405/25 |
| 3,837,169 A | * | 9/1974 | Lamberton ................... | 405/18 |
| 3,888,209 A | * | 6/1975 | Boots .......................... | 405/25 |
| 4,184,788 A | * | 1/1980 | Colle ........................... | 405/19 |
| 4,690,585 A | * | 9/1987 | Holmberg .................... | 405/19 |
| 4,710,057 A | | 12/1987 | Laier | |
| 4,729,691 A | * | 3/1988 | Sample ........................ | 405/21 |
| 4,778,309 A | * | 10/1988 | Bach et al. .................. | 405/258 |
| 4,804,293 A | * | 2/1989 | Varkonyi et al. ............. | 405/15 |
| 4,820,079 A | | 4/1989 | Wheeler | |
| 4,919,567 A | * | 4/1990 | Sample ........................ | 405/19 |
| 4,958,956 A | * | 9/1990 | Tanaka et al. ............... | 405/23 |
| 4,966,491 A | * | 10/1990 | Sample ........................ | 405/19 |
| 5,007,377 A | * | 4/1991 | Muench, Jr. ................. | 119/241 |
| 5,158,395 A | * | 10/1992 | Holmberg .................... | 405/21 |
| 5,238,326 A | * | 8/1993 | Creter ......................... | 405/25 |
| 5,449,543 A | * | 9/1995 | Bach et al. ............... | 405/258 X |
| 5,507,594 A | * | 4/1996 | Speicher ...................... | 405/25 |
| 5,645,373 A | * | 7/1997 | Jenkins ................... | 405/114 X |
| 5,762,448 A | * | 6/1998 | Bilanin ..................... | 405/30 X |
| 6,186,702 B1 | * | 2/2001 | Bartkowski .................. | 405/25 |

FOREIGN PATENT DOCUMENTS

| | | | | |
|---|---|---|---|---|
| EP | 0178510 | | 4/1986 | |
| EP | 178510 | * | 4/1986 | ............... 405/25 |
| EP | 0239287 | | 9/1987 | |
| EP | 0378310 | | 7/1990 | |
| GB | 1355979 | | 6/1974 | |
| GB | 2167795 | * | 6/1986 | ............... 405/16 |
| GB | 2267724 | | 12/1993 | |
| JP | 63022909 | * | 1/1988 | |
| JP | 2213510 | * | 8/1990 | ............... 405/25 |

* cited by examiner

Primary Examiner—Jong-Suk (James) Lee
(74) Attorney, Agent, or Firm—Ladas & Parry

(57) ABSTRACT

An artificial roof unit and method of forming it under water on a base includes locating a tube of a flexible material divided by dividing walls of a flexible material into an array of compartments running the length of the tube, with a first end of the tube on the base and a second end of the tube above the first end of the tube and under water, securing the tube in position on the base using flexible or rigid elements attached to the base; and partially filling some of the compartments with a filler material so that some of the compartments are adjacent two or more other compartments filled with a filler material to support and be supported by the adjacent compartments. The artificial reef unit may be designed to promote an increase in marine life, or to protect a shore line or harbor wall from damage.

10 Claims, 3 Drawing Sheets

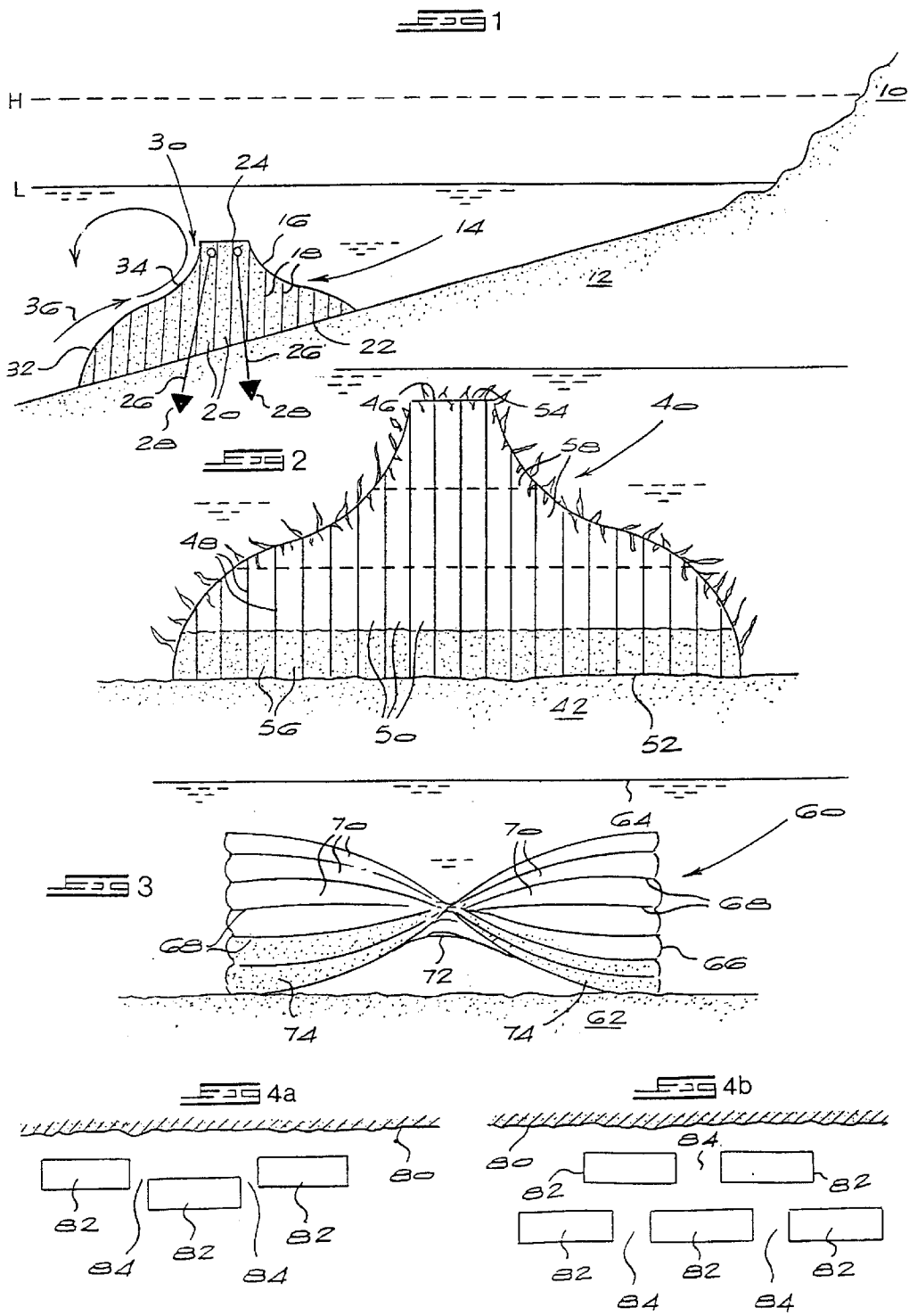

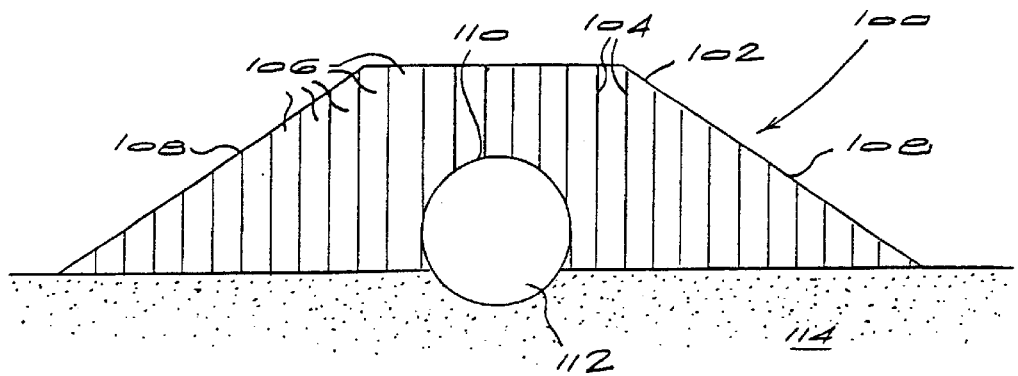
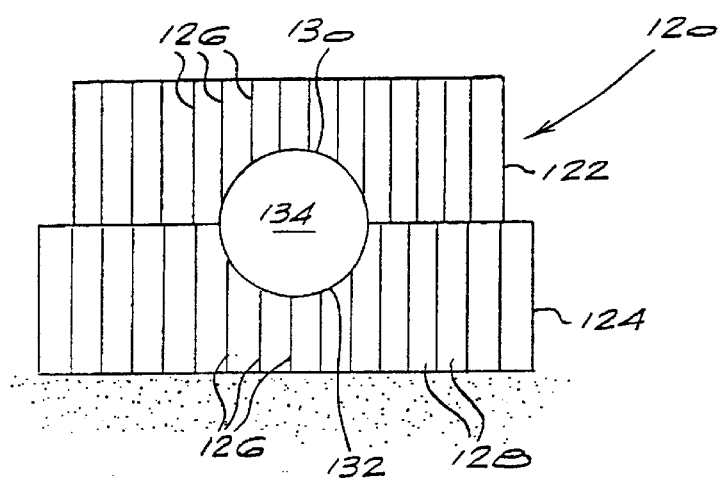
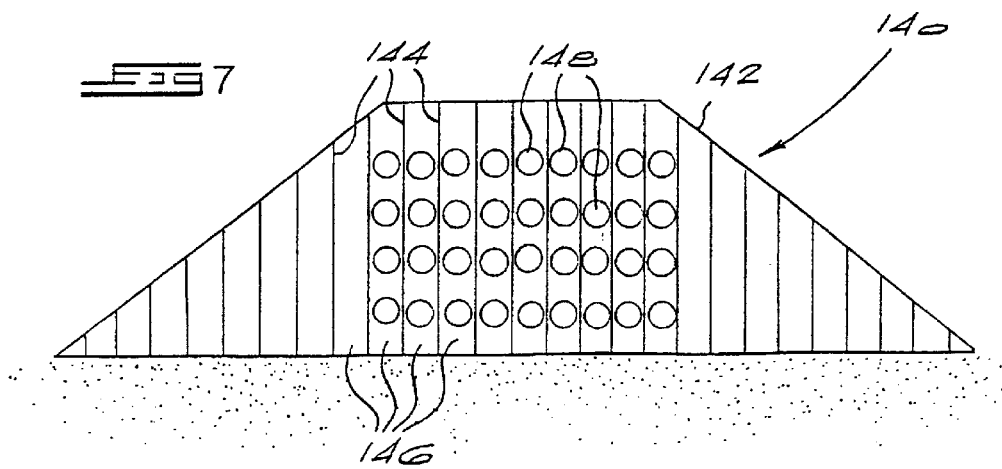

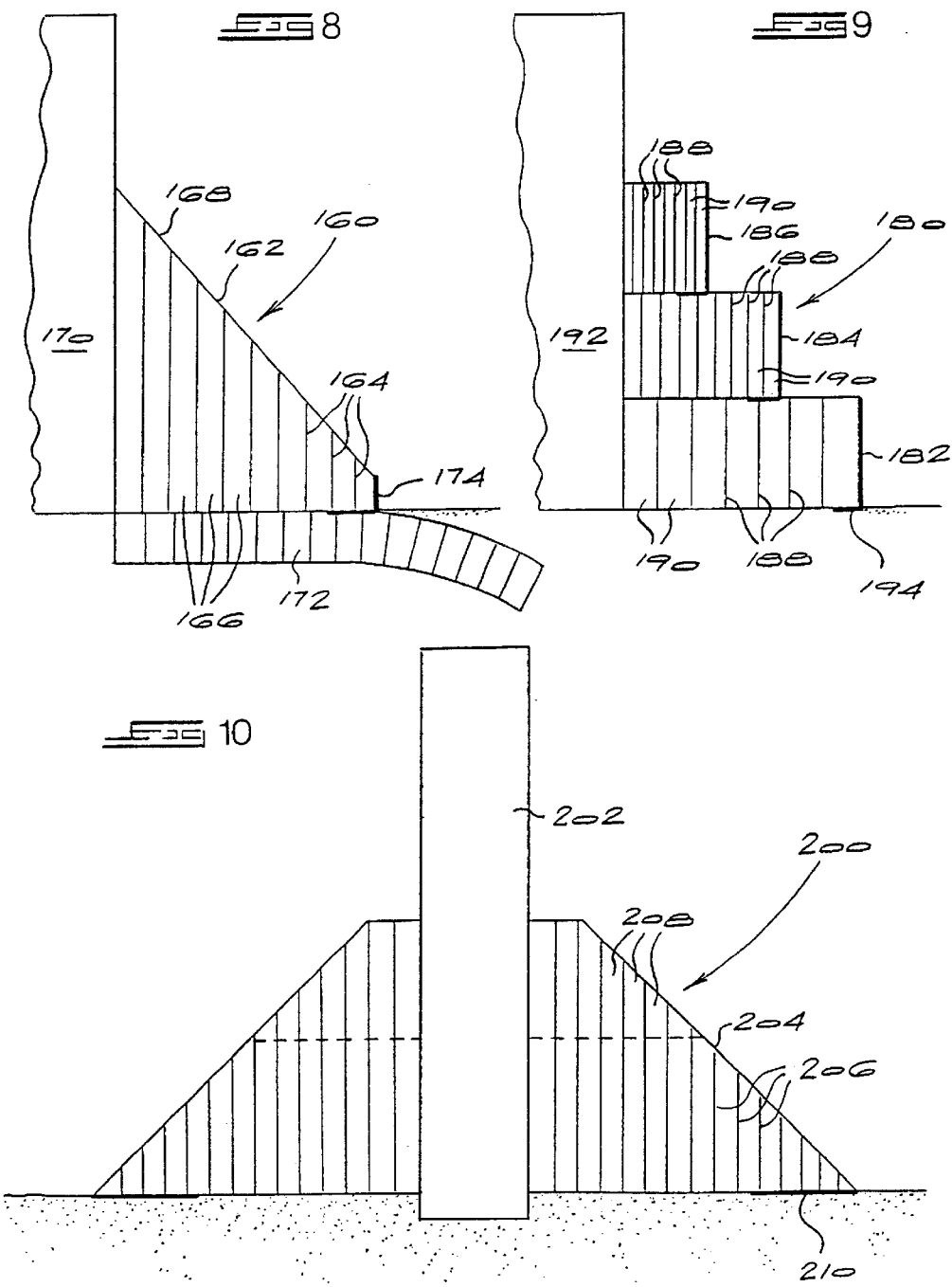

ARTIFICIAL REEF UNIT AND METHOD OF FORMING THE SAME

BACKGROUND TO THE INVENTION

This invention relates to a method of forming an artificial reef unit under water, to an artificial reef unit so formed, and to elements for use in its construction.

It is well known to form support structures such as roadways, canals or river or bank linings and the like from a material having a honeycomb structure, i.e having a plurality of compartments or cells divided by dividing walls, each compartment or cell being filled with a suitable filler material. Examples of such materials for use in these support structures are Hyson-Cells from M & S Techical Consultants & Services (Pty) Limited, Geoweb from Presto Products Co, Tenweb from Tenax Corp, Armater from Crow Company, Terracell from Webtech Inc, Envirogrid from Akzo Nobel Geosynthetics Co and Geocells from Kaytech.

However, there is always a need for new methods of utilising this tube material.

SUMMARY OF THE INVENTION

According to a first aspect of the invention there is provided a method of forming an artificial reef unit under water on a base which comprises the steps of:

(1) locating a tube of a flexible material divided by dividing walls of a flexible material into an array of compartments or cells running the length of the tube, the compartments being arranged in rows and columns so that the tube divided by the dividing walls has a honeycomb structure, with a first end of the tube on the base and a second end of the tube above the first end of the tube and under water;

(2) securing the tube in position on the base using one or more flexible and/or rigid elements attached to a fixed object, e.g the base; and (3) at least partially filling some or all of the compartments with a filler material so that at least some of the compartments are adjacent two or more other compartments filled with a filler material to support and be supported by the adjacent compartments.

A single artificial reef unit may be formed as described above to provide an artificial reef. However, in general, a plurality of artificial reef units will be formed in series, abutting or overlapping one another, or with spaces there between, to form the artificial reef.

The artificial reef unit of the invention may be used in a fresh water environment or, preferably, in the sea.

When the artificial reef unit is intended for under the sea or in an environment where there are waves, the side of the tube facing open water, i.e facing away from the shore, is preferably suitably profiled, e.g curved to dissipate wave energy by deflecting the waves. For example, a portion of the tube from the first end of the tube to a mid point of the tube is preferably convex in cross-sectional shape and a portion of the tube from the mid point of the tube to the second end of the tube is preferably concave in cross-sectional shape so that a wave striking this side of the tube is rolled up and over away from the shore. Alternatively the side of the tube facing open water may be sloped so that a wave striking this side of the tube is slowed and/or broken up.

In addition, the side of the tube facing the shore may also be sloped or curved if desired.

In step (2) of the method of the invention, any suitable means may be used to secure the tube in position on the base. For example, a flexible string or a rigid stay may be located through a row of compartments at or near each outer row of the array and a flexible string or a rigid stay may be located through a column of compartments at or near each outer column of the array. The ends of the strings may then be attached to fixed objects, such as for example the base, to support the tube in position.

Alternatively, a semi rigid or rigid stay may be attached to each corner of the tube, with the free ends of each stay being anchored to the base. In this case the stays may later be removed for re-use, once step (3) is complete.

The use of flexible strings or rigid stays to support a tube in position is described in more detail in co-pending application PCT/IB 99/00965, which is incorporated herein by reference.

In one embodiment of the invention, when the artificial reef unit is designed to dissipate wave action or to protect a shore, in step (3), it is preferable that all the compartments are substantially filled with the filler material.

In a second embodiment of the invention, when the artificial reef unit is designed to provide an area for the propagation of marine life, it is preferable that some or all of the compartments are only partially filled with the filler material so as to leave spaces for fish and other marine creatures.

In this second embodiment, the edges of the compartments at the second end of the tube may be frayed to make the artificial reef unit more marine friendly. The frayed edges resemble fronds of seaweed.

The filler material may be sand or any other material from the area where the artificial reef unit is located. Alternatively, suitable filler material can be imported from an external source.

The nature of the filler material in the various compartments of an artificial reef unit may be varied. For example some compartments, particularly those abutting a fixed structure such as a pier or wall or pipeline, may be filled with a cementitious material, while others of the compartments may be filled with sand or gravel.

The tube and the dividing walls may be made from any suitable flexible material. Although the material must possess some degree of flexibility, the degree of flexibility may range from very flexible up to semi-rigid. The flexible material may be for example a plastics material such as for example a co-extruded or a bi-axially extruded plastics material; a plastics mesh material; a plastics laminate material such as for example a laminate of a plastics material and a metallic material or a textile material; a metallic material; a woven or non-woven textile material; a paper or cardboard material; and the like.

The flexible material is preferably a suitable plastics material.

The tube may have any suitable height and any suitable compartment size. For example, the height of the tube may range from 100 mm to 10 m and each compartment may have a wall length of from 5 mm up to 2 m. In certain instances, it may be desirable for the outer walls to be longer than the inner dividing walls at the first end. This allows for the extra material to be tucked underneath one or more of the compartments to prevent loss of filler material by undermining.

The compartments in the tube may have any suitable cross-section, such as triangular, square, hexagonal or octagonal, but preferably have a square cross-section, i.e each compartment is defined by four walls of substantially equal length.

The cross-sectional size of the compartments may reduce or increase in size in the tube. For example, the compartments may be of three different sizes, with the cross-sectional size of the compartments in a first row and in one or more rows adjacent the first row being greater than the cross-sectional size of the compartments of one or more rows intermediate the first and last rows of compartments, which in turn have a greater cross-sectional size than the cross-sectional size of the compartments in the last row and in one or more rows adjacent the last row of compartments.

The use of compartments with different cross-sectional sizes is described in more detail in co-pending application PCT/IB99/00967 which is incorporated herein by reference.

According to a second aspect of the invention there is provided an artificial reef unit formed as described above.

According to a third aspect of the invention there is provided an artificial reef formed from a plurality of artificial reef units, placed in series, each artificial reef unit being formed as described above.

According to a fourth aspect of the invention there is provided a method of forming an artificial reef unit under water on a base which comprises the steps of:

(a) locating a tube of a flexible material divided by dividing walls of a flexible material into an array of compartments or cells running the length of the tube, the compartments being arranged in rows and columns so that the tube divided by dividing walls has a honeycomb structure, with the axes of the compartments substantially parallel to the base;

(b) constricting the compartments at a point between the two ends of the tube;

(c) securing the tube in position on the base using flexible and/or rigid elements attached to a fixed object, e.g the base; and (d) at least partially filling some or all of the compartments with a filler material to hold the tube in position on the base to form the artificial reef unit.

According to a fifth aspect of the invention there is provided an artificial reef unit formed as described above.

BRIEF DESCRIPTION OF THE DRAWINGS

FIG. 1 is a schematic view of a first artificial reef unit of the invention;

FIG. 2 is a schematic view of a second artificial reef unit of the invention;

FIG. 3 is a schematic view of a third artificial reef unit of the invention;

FIGS. 4a and 4b are schematic plan views of respective artificial reefs formed from artificial reef units of the invention;

FIG. 5 is a schematic view of a fourth artificial reef unit of the invention;

FIG. 6 is a schematic view of a fifth artificial reef unit of the invention;

FIG. 7 is a schematic view of a sixth artificial reef unit of the invention;

FIG. 8 is a schematic view of a seventh artificial reef unit of the invention;

FIG. 9 is a schematic view of an eighth artificial reef unit of the invention; and FIG. 10 is a schematic view of a ninth artificial reef unit of the invention.

DESCRIPTION OF EMBODIMENTS

The crux of the invention is a method of forming an artificial reef unit under water on a base, and an artificial reef unit so made. This will be described in more detail with reference to the accompanying drawings.

Referring to FIG. 1, there is shown a profile of a sea shore. The area above the high tide mark, i.e the shore is indicated by the numeral 10, the high tide mark is indicated by the dotted line marked H, the low tide mark is indicated by the solid line marked L, and the sea bed is indicated by the numeral 12.

Located on the sea bed 12 which forms the base, is an artificial reef unit 14.

The artificial reef unit 14 consists of a tube 16 of a flexible material divided by dividing walls 18 of a flexible material into an array of compartments 20 running the length of the tube 16. The compartments 20 are arranged in rows and columns so that the tube 16 divided by the dividing walls 18 has a honeycomb structure. A first end 22 of the tube 16 is located on the sea bed 12 and a second end 24 of the tube 16 is located above the first end 22 of the tube 16 and under water at all times.

The tube 16 is secured in position on the sea bed 12 using flexible strings or stays 26, only two of which are illustrated, which in turn are secured to the sea bed 12 by means of anchors 28. These flexible stays 26 anchored into the sea bed 12 serve to hold the tube 16 in position.

The compartments 20 of the tube 16 are all substantially filled with a filler material such as sand or gravel pumped from the sea bed 12 around the artificial reef unit 14 and into the compartments 20. Thus, the compartments 20 support one another.

It can be seen that the side 30 of the tube 16 facing open water, is curved to dissipate wave action. A portion 32 of the tube 16 is convex in cross-sectional shape and a portion 34 of the tube 16 is concave in cross-sectional shape so that a wave indicated schematically by the arrow 36 striking the side 30 of the tube 16 is rolled up and over away from the shore 10.

The artificial reef unit 14 is illustrated in position on the sea bed. However, a similar artificial reef unit 14 may also be located on the floor of a river or a dam or any other body of water.

It is also to be noted, that the artificial reef unit 14 is filled with a filler material such as sand or gravel pumped from the sea bed 12 around the artificial reef unit 14. Alternatively, a suitable filler material may be imported such as for example quarry materials, crushed building waste, mine waste aggregates, and the like. Further, in certain circumstances, some or all of the compartments may be filled with a cementitious filler material such as for example concrete, soilcrete, grouts, no-fines-concrete and the like. Other suitable filler materials also include a chipped foam or rubber material and the like.

Referring to FIG. 2 there is shown a second embodiment of an artificial reef unit 40 located on a sea bed 42 below the water line 44.

This artificial reef unit 40 is again constructed from a tube 46 of a flexible material divided by dividing walls 48 into a plurality of compartments 50 running the length of the tube 46, with the compartments 50 being arranged in rows and columns so that the tube 46 divided by the dividing walls 48 has a honeycomb structure. A first end 52 of the tube 46 is located on the sea bed 42 and a second end 54 of the tube 46 is located above the first end 52 and under the water line 44.

The tube 46 may be secured in position as illustrated in FIG. 1.

The compartments 50 of the tube 46 are only partially filled with a filler material 56 to provide spaces 58 thereabove to be occupied by marine life.

The edges of the compartments 50 may be frayed as illustrated to make the artificial reef unit 40 more marine friendly.

As indicated above, the artificial reef unit 40 is not designed primarily for the dissipation of wave action to protect a shore line, but is designed to provide a habitat for the propagation of marine life. In use, fish, shell fish, seaweed and the like take up residence in the spaces 58 created in the compartments 50, as they would use crevices in a natural reef.

The artificial reef unit 40 may also be used for intensive aquaculture. For example, a net or the like may be placed over the open ends of the compartments 50 to retain marine life in the compartments 50.

In this case, the artificial reef unit 40 is constructed from a single tube 46. Alternatively, the reef unit 40 may be constructed from more than one tube, as shown in phantom lines. In this latter case, if the additional tubes are to be filled with filler material, an appropriate base is provided below each tube to prevent loss of filler material.

Referring to FIG. 3 there is shown a third embodiment of an artificial reef unit 60 located on a seabed 62 under the water line 64.

In this case, a tube 66 of a flexible material divided by dividing walls 68 into a plurality of compartments 70 running the length of the tube 66, is located on its side on the sea bed 62 so that the axes of the compartment 70 are substantially parallel to the sea bed 62.

The tube 66 is constricted at a point 72, for example by placing a flexible string around the tube 66 and drawing the ends together, as illustrated.

The tube 66 is secured in position on the sea bed 62 using flexible or rigid strings or stays, as illustrated in FIG. 1.

Some of the compartments 70, particularly those lying the on the sea bed 62 are filled partially or completely with a filler material 74 to hold the tube 66 in position on the sea bed 62. Again, the artificial reef unit 60 provides a habitat for marine life as described above.

Referring to FIG. 4a, there is shown a plan view of an artificial reef located off a shore 80. The artificial reef is composed of individual artificial reef units 82 arranged in series as illustrated. There may be spaces 84 between the artificial reef units 82 to permit the passage of boats and the like. An alternative arrangement of reef units 82 and spaces 84 is illustrated in FIG. 4b.

The artificial reef units of the invention may also be used to protect or support fixed structures located under water, for example piers, walls and pipelines, and variations of this are illustrated in FIGS. 5 to 10.

Referring to FIG. 5 there is shown an artificial reef unit 100 which again consists of a tube 102 of a flexible material divided by dividing walls 104 of a flexible material into an array of compartments 106 running the length of the tube 102. The sides 108 of the tube 102 are cut at an angle to assist in dissipating wave energy. The tube 102 also includes a circular cut out 110 so that the tube 102 may be located over a pipeline 112 which is located on the sea bed 114.

The compartments 106 may be filled with any suitable filler material. For example, certain of the compartments 106 may be filled with a cementitious material so as to secure the artificial reef unit 100 and to protect the pipeline 112, and other of the compartments may be filled with sand or gravel or the like. Alternatively, all of the compartments 106 may be filled with sand or gravel or the like, to provide a marine friendly habitat.

Referring to FIG. 6 there is shown an artificial reef unit 120 which consists of two tubes 122, 124. Each tube 122, 124 is made of a flexible material and is divided by dividing walls 126 of a flexible material into an array of compartments 128 running the length of the tubes 122, 124. Again, each tube 122, 124 includes a semicircular cut out 130, 132 to accommodate a pipeline 134. Again, the compartments 128 may be filled with a suitable filler material to locate the tubes 122, 124 in position around the pipeline 134 and to protect it.

Referring to FIG. 7 there is shown an artificial reef unit 140 which consists of a tube 142 of a flexible material divided by dividing walls 144 of a flexible material into an array of compartments 146 running the length of the tube 142. Located through the artificial reef unit 140 are a series of small pipes 148. Again, the compartments 146 are filled with a suitable filler material to hold the artificial reef unit in position on a sea bed or a dam bed or the like. The pipes 148 provide a habitat for marine or dam life.

Referring to FIG. 8 there is shown an artificial reef unit 160 which again consists of a tube 162 of a flexible material divided by dividing walls 164 of a flexible material into an array of compartments 166 running the length of the tube 162. The side 168 of the tube 162 is sloped as indicated. The artificial reef unit 160 is located in position against a wall 170, for example a harbour wall or the like. The compartments 166 are filled with a suitable filler material. In this case, it is preferable that the compartments 166 adjacent the wall 170 are filled with a cementitious material such as for example concrete, while the remainder of the compartments 166 may be filled with another type of filler material such as sand or gravel. The artificial reef unit 160 acts to protect the wall 170 against wave action, and against undermining and the like. If necessary, an additional tube 172 may be provided to assist in protecting the wall 170. The tube 172 is arranged to subside if any undermining does occur, thereby presenting an additional barrier to protect the wall 170.

Referring to FIG. 9 there is shown an artificial reef unit 180 which consists of three tubes 182, 184 and 186. Each tube 182, 184, 186 is formed of a flexible material and is divided by dividing walls 188 of a flexible material into an array of compartments 190 running the length of the tubes 182, 184, 186. It can be seen that the compartments 190 in the tube 182 are of a greater cross-sectional size than the compartments 190 of the tube 184, which in turn are of a greater cross-sectional size than the compartments 190 of the tube 186. This has advantages in certain circumstances. Additionally, the outer dividing walls 188 may be longer than the inner dividing walls 188. As a result, the extra material 194 can be tucked under the first few rows of compartments 190 of the respective tubes 182, 184 and 186 to prevent the loss of tube material if used.

Again, the artificial reef unit 180 is located against a wall 192 such as for example a harbour wall or a dam wall or the like. The artificial reef unit 180 performs the same function as the artificial reef unit 160.

Referring to FIG. 10 there is shown an artificial reef unit 200 which is partially cut away. The artificial reef unit 200 encircles a pier 202 for protection thereof. The artificial reef unit 200 consists of a tube 204 of a flexible material divided by dividing walls 206 of a flexible material into an array of compartments 208 running the length of the tube 204. Again, the compartments 208 may be filled with a suitable filler material to hold the artificial reef unit 200 in position around the pier 202, and to protect the pier 202. The artificial reef unit 200 again stops undermining of the pier and prevents mechanical damage to the pier. An extra section 210 of flexible material can once again be provided to prevent loss of filler material by undermining.

As indicated above, the artificial reef units of the invention can be installed as single continuous units or as banks of units to allow for some flow of water. The artificial reef unit and reefs formed therefrom can be used to absorb wave energy and to stop large waves breaking onto a shore and thus to protect beaches from erosion. The artificial reef units and reefs can also be used to deflect currents toward or away from harbours, river mouths, marinas and the like. The artificial reef units and reef units formed therefrom can also be used to form sea walls for dredging operations to take place.

The advantage of the artificial reef unit of the invention and of the method of making it, is its ease of construction and the fact that it is made from relatively inexpensive materials, and the fact that it can easily be shaped to meet requirements.

What is claimed is:

1. A method of forming an artificial reef unit under water on a base comprises the steps of:

(1) locating a tube of a flexible material divided by dividing walls of a flexible material into an array of compartments or cells running the length of the tube, the compartments being arranged in rows and columns so that the tube divided by the dividing walls has a honeycomb structure, with a first end of the tube on the base and a second end of the tube above the first end of the tube and under water;

(2) securing the tube in position on the base using one or more elements selected from the group consisting of flexible elements and rigid elements, attached to a fixed object; and (3) at least partially filling some or all of the compartments with a filler material so that at least some of the compartments are adjacent two or more other compartments filled with the filler material to support and be supported by the adjacent compartments; and wherein a side of the tube facing open water in use is profiled to dissipate wave energy by deflecting the waves.

2. A method according to claim 1 wherein a first portion of the tube from the first end of the tube to a mid point of the tube is convex in cross-sectional shape and a second portion of the tube from the mid point of the tube to the second end of the tube is concave in cross-sectional shape so that a wave striking the side of the tube is rolled up and over away from the shore.

3. A method according to any one of claims 1 to 2 wherein in step (2) of the method of the invention a first flexible string is located through a row of compartments at or near each outer row of the array and a second flexible string is located through a column of compartments at or near each outer column of the compartments, the ends of the strings being attached to fixed objects to support the tube in position.

4. A method according to any one of claims 1 to 2 wherein in step (2) of the method of the invention a first rigid stay is located through a row of compartments at or near each outer row of the array and a second rigid stay is located through a column of compartments at or near each outer column of the compartments, the ends of the stays being attached to fixed objects to support the tube in position.

5. A method according to claim 1 wherein the tube includes compartments with at least two different cross-sectional sizes.

6. A method according to claim 1 wherein the tube and the dividing walls are made form a suitable plastics material.

7. A method according to claim 1 wherein in step (3) all the compartments are substantially filled with the filler material.

8. A method according to claim 1 wherein in step (3) some or all of the compartments are only partially filled with the filler material so as to leave space for fish and other marine creatures.

9. An artificial reef unit for location under water on a base comprises a tube of a flexible material divided by dividing walls of a flexible material into an array of compartments running the length of the tube, the compartments being arranged in rows and columns so that the tube divided by the dividing walls has a honeycomb structure, a first end of the tube being located on the base and a second end of the tube being above the first end of the tube and under water;

one or more elements selected from the group consisting of flexible elements and rigid elements on the base, the elements being attached to a fixed object; and a filler material filling some or all of the compartments so that at least some of the compartments are adjacent two or more other compartments filled with the filler material to support and be supported by the adjacent compartments.

10. An artificial reef comprises a plurality of the artificial reef units according to claim 8, placed in series.

* * * * *